(12) United States Patent  (10) Patent No.: US 9,164,776 B2
Rauh et al.  (45) Date of Patent: Oct. 20, 2015

(54) DYNAMIC DETERMINATION OF NAVIGATION TARGETS IN A FLEXIBLE USER INTERFACE ENVIRONMENT

(75) Inventors: Alexander Rauh, Weinheim (DE); Lars Erbe, Stutensee (DE); Thomas Gieselmann, Hockenheim (DE); Franz Mueller, Stutensee (DE); Sri Vidhya Ambuga Nandakumar, Bangalore (IN); Nina Tabitha Paul, Bangalore (IN); Stefan Haffner, Hockenheim (DE); Vibhor Tomar, Bangalore (IN); Holger Schmidt, Sinsheim (DE)

(73) Assignee: SAP AG, Walldorf (DE)

( * ) Notice: Subject to any disclaimer, the term of this patent is extended or adjusted under 35 U.S.C. 154(b) by 794 days.

(21) Appl. No.: 12/976,877

(22) Filed: Dec. 22, 2010

(65) Prior Publication Data

US 2012/0167016 A1  Jun. 28, 2012

(51) Int. Cl.
*G06F 3/048* (2013.01)
*G06F 9/44* (2006.01)
*G06F 17/30* (2006.01)

(52) U.S. Cl.
CPC ........ *G06F 9/4443* (2013.01); *G06F 17/30908* (2013.01)

(58) Field of Classification Search
USPC ........................................................ 715/854
See application file for complete search history.

(56) References Cited

U.S. PATENT DOCUMENTS

| | | | |
|---|---|---|---|
| 2004/0015476 A1* | 1/2004 | Twaddle | 707/1 |
| 2008/0183573 A1* | 7/2008 | Muschetto | 705/14 |
| 2009/0044152 A1* | 2/2009 | Bohn et al. | 715/854 |
| 2009/0287734 A1* | 11/2009 | Borders | 707/102 |

OTHER PUBLICATIONS

"Beginning C# Objects: From Concepts to Code" by Jacquie Barker, Grant Palmer published 2004 Available at: http://books.google.com/books?id=id86cAxxffcC&q=634#v=onepage&q=parse%20tab&f=false.*
"Dynamic user interface adaptation based on operator role and task models" by Robin R. Penner (hereinafter Penner) Published Oct. 2000 available at http://ieeexplore.ieee.org/xpls/abs_all.jsp?arnumber=885999&tag=1.*

* cited by examiner

*Primary Examiner* — Peiyong Weng
(74) *Attorney, Agent, or Firm* — Mintz Levin Cohn Ferris Glovsky and Popeo, P.C.

(57) ABSTRACT

A plurality of registrations corresponding to a user interface component can be stored. Based on at least one of a layer of a software architecture to which a specific user of a user interface has authorized access, an assignment of a work center view to the user, and business data, it can be determined that the user interface presented to the user should include a navigation target to the user interface component. At run time, a navigation link to the user interface component can be dynamically generated according to a relevant registration selected from the plurality of registrations. The user interface incorporating the navigation link to the user interface component can be displayed. Related systems, articles of manufacture, and computer-implemented methods are described.

12 Claims, 7 Drawing Sheets

DYNAMIC DETERMINATION OF NAVIGATION TARGETS IN A FLEXIBLE USER INTERFACE ENVIRONMENT

The current applicant is related to co-pending and co-owned application Ser. No. 12/976,868 (now issued U.S. Pat. No. 8,578,278), filed on Dec. 22, 2010 and entitled "Dynamic User Interface Content Adaptation and Aggregation" and Ser. No. 12/976,968 (now issued U.S. Pat. No. 8,707,398), filed on Dec. 22, 2010 and entitled "Metadata Container-Based User Interface Flexibility," the disclosures of which are each incorporated by reference.

TECHNICAL FIELD

The subject matter described herein relates to dynamically determinable navigation targets in a flexible user interface environment.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, ERP software architectures can be designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like. The customized version of the core software platform presented to users at to an organization can therefore differ from the customized versions presented to users at other organizations. Additionally, within an organization, different subsets of users may need access to different sets of features. Customization of user interface environments to meet this variety of user needs can be cumbersome and time consuming.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Large organizations can generally justify the expense of tasking one or more programmers and user interface architects to design customized, hard coded user interface features to provide appropriate functionality to each of one or more classes of users.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network. Creation of customized user interface functionality for smaller organizations, for example by hard-coding of user interfaces and the required user interface navigation targets for each of one or more classes of users, can add significantly to the total cost of ownership. Such services can be provided by the SaaS provider, but doing so can be similarly inefficient, particularly for smaller client organizations that each require a custom installation, and can also require ongoing maintenance and updating services to reflect new functionality provided either by the SaaS provider or by third party applications from one or more external service providers that are integrated into the customized core software platform.

SUMMARY

In one aspect, a computer-implemented method includes storing a plurality of registrations corresponding to a user interface component. Based on at least one of a layer of a software architecture to which a specific user of a user interface has authorized access, an assignment of a work center view to the user, and business data, it is determined that the user interface presented to the user should include a navigation target to the user interface component. At run time, a navigation link to the user interface component is dynamically generated according to a relevant registration selected from the plurality of registrations. The user interface incorporating the navigation link to the user interface component is displayed.

In optional variations, one or more of the following features can also be included. The determining that the user interface presented to the user should include the navigation target can include at least one of determining a layer of a software architecture to which the user has authorized access, determining an assignment of a work center view to the user, and determining that business data of an organization to which the user belongs indicates a need for the user interface component. The dynamically generating the navigation link can include retrieving a template string for navigation targeting from a navigation repository; splitting the template string into a first substring including content of the template string occurring prior to a first tag element indicating a start point of a section of the template where a custom navigation link is to be embedded and a second substring including content of the template string occurring subsequent to the first tag element; splitting the second substring into a third substring including content of the second substring prior to a second tag element indicating an endpoint of the section of the template and a fourth substring including content of the second second substring subsequent to the second tag element; generating a fifth substring by appending an header to a beginning of the third substring, creating a document object model for the third substring, processing the third substring using the document object model, and removing the header; and concatenating the first substring, the fifth substring, and the fourth substring to form the navigation link. A navigation query provided by a user interface component provider can be received with a request to resolve it to a target component. A navigation descriptor identifier can be computed for the specific user can be computed based on information in the navigation query. The relevant registration can be selected according to the navigation descriptor identifier.

A computer program product as in claim 1, wherein the user interface can be provided to the user via a client tenant of a multi-tenant system that can include an application server providing access for each of a plurality of organizations to one of a plurality of client tenants. Each of the plurality of client tenants can include a customizable, organization-specific version of a core software platform that also integrates business functionality provided by at least one external software provider. The data repository can include core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants. The user interface component can provide access to one of the core platform content, the system content, the client tenant-specific content, and external service provider content from the at least one external service provider.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

Implementations of the current subject matter can provide many advantages, including, but not necessarily limited to the following. Flexible user interface functionality can be provided via a dynamic framework that can be executed at run time to deliver customized user interface features to a user without requiring hard coding of navigation targets or links. This capability can be very useful in a multi-tenant software architecture or in other environments in which design time hard coding of navigation links to navigation targets in a user interface can be difficult because of the end for flexibility in how aspects of the user interface are presented to users in different organizations as well as to different users in a single organization.

It should be noted that, while the descriptions of specific implementations of the current subject matter discuss delivery of enterprise resource planning software to multiple organizations via a multi-tenant system, the current subject matter is applicable to other types of software and data services access as well.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, one or more implementations of the current subject matter provide methods, systems, articles or manufacture, and the like that can, among other possible advantages, provide resolution of logical navigation targets in a customizable software architecture that supports multiple potential applicant scopes.

Navigation steps between user interface components can be defined in a manner that allows flexible determination of navigation targets according to specific use cases, for example in a multi-tenant software delivery architecture. The semantic of a business object, a business object node name, an operation, a freely definable context attribute, or the like can be used as a navigation query for requesting a navigation target. Each application user interface or user interface component that can be a navigation target defines one or more navigation characteristics as part of a navigation target descriptor indicating which kind of navigation requests are supported.

Multiple registrations can be defined for any given set of logical navigation information. Target determination can be based on a layer within which a user interface component resides, such as for example a customer layer, a partner applicant layer, a core software application layer, or the like. Alternatively or in addition, user work center view assignments can provide a basis for target determination as can business data of the organization for which the user interface is provided. At runtime, only a single user interface can be returned by a component in response to a navigation query. If not, the navigation is ambiguous. Navigation according to implementations of the current subject matter can prevent this situation.

Figure 1:
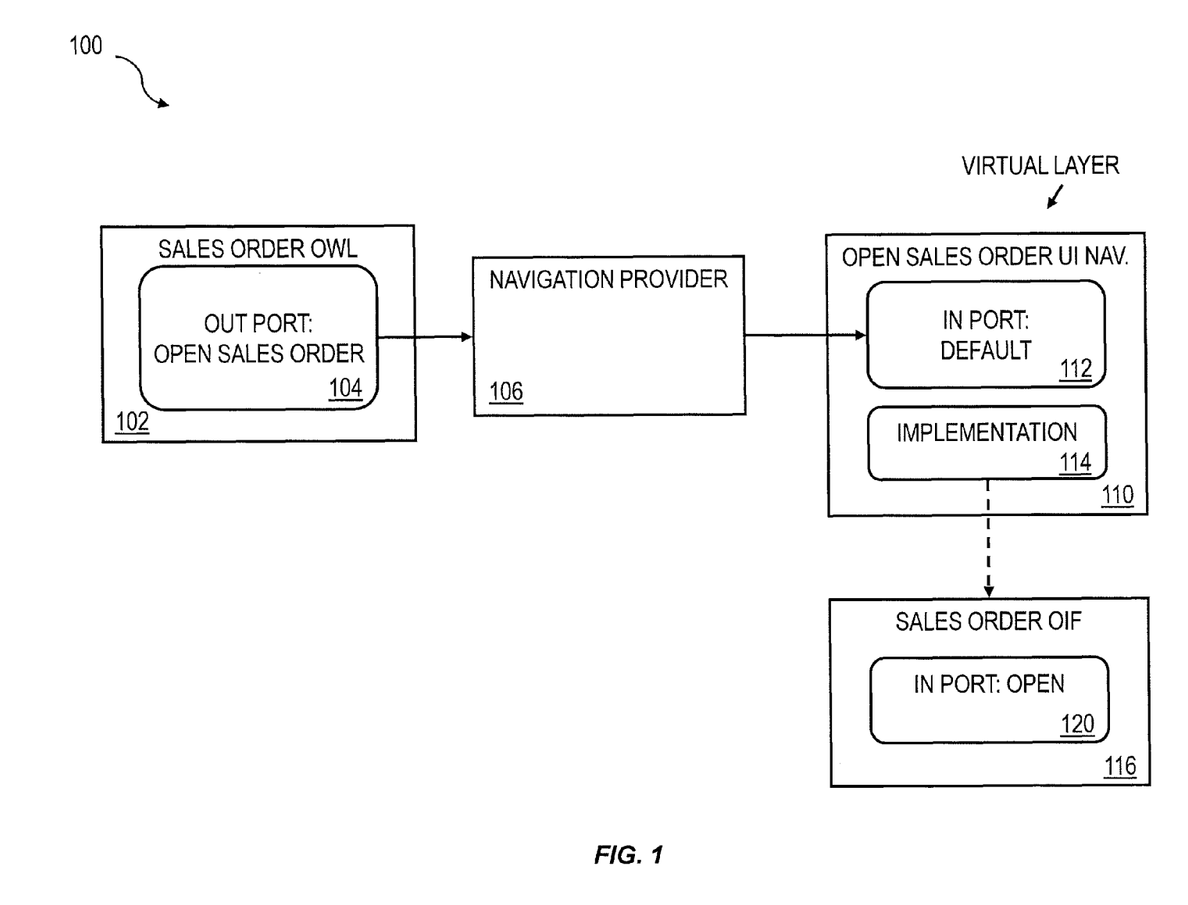
FIG. 1 is a diagram illustrating decoupling of source and target within a navigation.

As shown in the example navigation scenario for a user interface around a sales order business process illustrated in the flow chart 100 of FIG. 1, a sales order business object 102, which can be defined using an object work list (OWL), can include a navigation target 104 for opening a sales order. The navigation target 104 can direct to a navigation provider 106, which can include a navigation link to a user interface component 110 directed to opening a sales order. The user interface component 110 be instantiated in a virtual layer and can receive the navigation link 106 via an in port 112. A user interface implementation 114 of the user interface component 110 can include a navigation target for a sales order floorplan for an object instance (OIF) 116 whose in port 120 opens the sales order.

A navigation target can be decoupled from the navigation source. For example, a target can be replaced by a third party service provider or by the service center. After a scoping phase (described in more detail below) the navigation target does not change anymore in the customer system. The navigation target can differ depending on the assigned work center views of the current user. For example, dynamic navigation can be provided based on data of a current business object. The value of a business object attribute (e.g. language) can be used to determine the navigation target. The navigation target can be different, depending on the business scope that the customer has selected. Navigation features can include quick links to OWL navigation, navigation from control center or work center quick links to OWLs, navigation to an external URL, and the like. A quick link can be displayed on a work center overview view and can represent links to default sets OWLs of views of the work centers which have been flagged in OWL metadata as applicable for the current user. External URLs can be launched from within a user interface, from an external user interface to an internal user interface component of a core software platform, from an external user interface (e.g. via a collaboration window, a spreadsheet, and email to a user interface component, or the like), etc.

Replacement of navigation targets can occur at a service provider partner, a core software service center, or the like. Service provider partners and the service center can change navigation targets in a customer system. Before launching task execution user interfaces, a business task management (BTM) framework can be called to select, verify, and, if necessary, change the navigation target.

Special requirements can be included to navigate in the correct way from a normal floor plan to a report, between reports and back, etc. Starting from an activity list, one or more business configuration views and application user interfaces can be launched using a navigation approach consistent with implementations described herein. For business configuration views, a dummy business object can be used. For example, a business configuration schema identifier can be used is used as an operator, and a business configuration set identifier can be used as a context attribute value. All business configuration parameters together can represent a complete navigation query into which one or more business configuration target floor plans can be registered.

A navigation repository storing user interface models can be accessed via a layering strategy that defines the sequence of layers to be accessed. Layers can include, but are not limited to a core platform layer (e.g. for providing standard content delivered by an ERP architecture), a globalization layer (e.g. for providing country-specific content), one or more independent software vendor (ISV) or partner layers (e.g. for providing content from external software components), and a customer layer (e.g. for personalization content). Content can be presented as a combination of layers in a specified order, for example with a customer layer at the top followed by one or more partner/ISV layers, a globalization layer, and a core platform layer. Content can be added, modified, or deleted in each successive layer to the content presented in the layers below it. Content from the highest presented layer should always be visible.

A navigation target descriptor can be over defined in each layer of the navigation repository to change the user interface component that supports a navigation query. Navigation targets can be pre-resolved at scoping time, once per logon session, once per request, or via some other approach. For each navigation link the pre-resolution of the navigation targets can advantageously be decided at design time to minimize the number of target resolutions at run time.

If a navigation link runs only within a given work center view, the navigation target can already be pre-resolved at scoping time. If a navigation link runs between two or more work center views, the view assignments of the current user should be considered when resolving the target. Therefore such navigation links should be resolved at least once per user session. If a navigation link can differ more dynamically, for example between each entry of an OWL, the target should be resolved per request due to the dynamic nature of such a scenario.

In case the navigation target is a user interface component inside a work center view or sub view, the navigation query can be extended by the target work center and work center view. User interface components can be re-used in several work center views, all supporting the same navigation query, due to the re-use. This situation can lead to an ambiguous navigation. A "quick link" user interface feature is a common instance where this scenario is relevant. So only dedicated user interface components will start an in-place navigation. Therefore this type of navigation cannot be modeled in the user interface designer. In general storing work center and view for navigation should be avoided. Otherwise, flexibility enhancements by partners, customers and users like creating new work centers can not be supported. In case an OWL is part of a page the user interface component infrastructure should be able to resolve the work center view that contains an OWL. In this case the view is returned as navigation target.

For a scope dependent use case in which two navigation targets exist at design time for the same navigation query, each navigation target should declare scope dependence at design time to be valid. In case the navigation target is not in scope, it can be removed from the navigation target descriptor at scoping time to avoid a navigation conflict at runtime.

Use cases are in the globalization area. There could be another navigation target for e.g. each fact sheet out of an OWL, depending on the instance data. Since the context attribute and the relevant attribute value might not be known at design time, a navigation plug-in can be specified which is called to define the required context attribute value.

If no navigation target exists that supports the complete navigation query (business object, node name, operation, context attribute value), a fallback logic determines if there is a valid navigation target that supports only business object, node name and operation (no context attribute value is set). If there is such a navigation target, this is returned as a valid navigation fallback. The assigned work centers and views of the current user can restrict the possible navigation options. At runtime, navigation steps that lead to targets outside of the current user context are not made possible.

To fulfill special navigation requirements like report or BTM navigation, an extension concept allows implementing navigation extensions which are called during resolution of the navigation target. In this "application exits" own logic like special authorization checks or dynamic determination of navigation targets can be implemented for specific use cases.

At design time, a navigation registry can provide interfaces for providing navigation query data, saving navigation target descriptors, and the like. When defining that user interface components should support navigation queries, the design time needs lists of operations and navigation attributes that are already used for a business object. In addition to the already used operations for a business object, a list of default operations is provided as well. The data can be provided by the navigation registry via RFC-enabled function modules.

For saving a navigation target descriptor the navigation query and the navigation target are required. The navigation query consists of business object, node name, operation and optionally a context attribute value which can be freely defined. The navigation target should be an existing user interface component that supports the navigation query. The user interface component provider passes over this information to the navigation registry.

Figure 2:
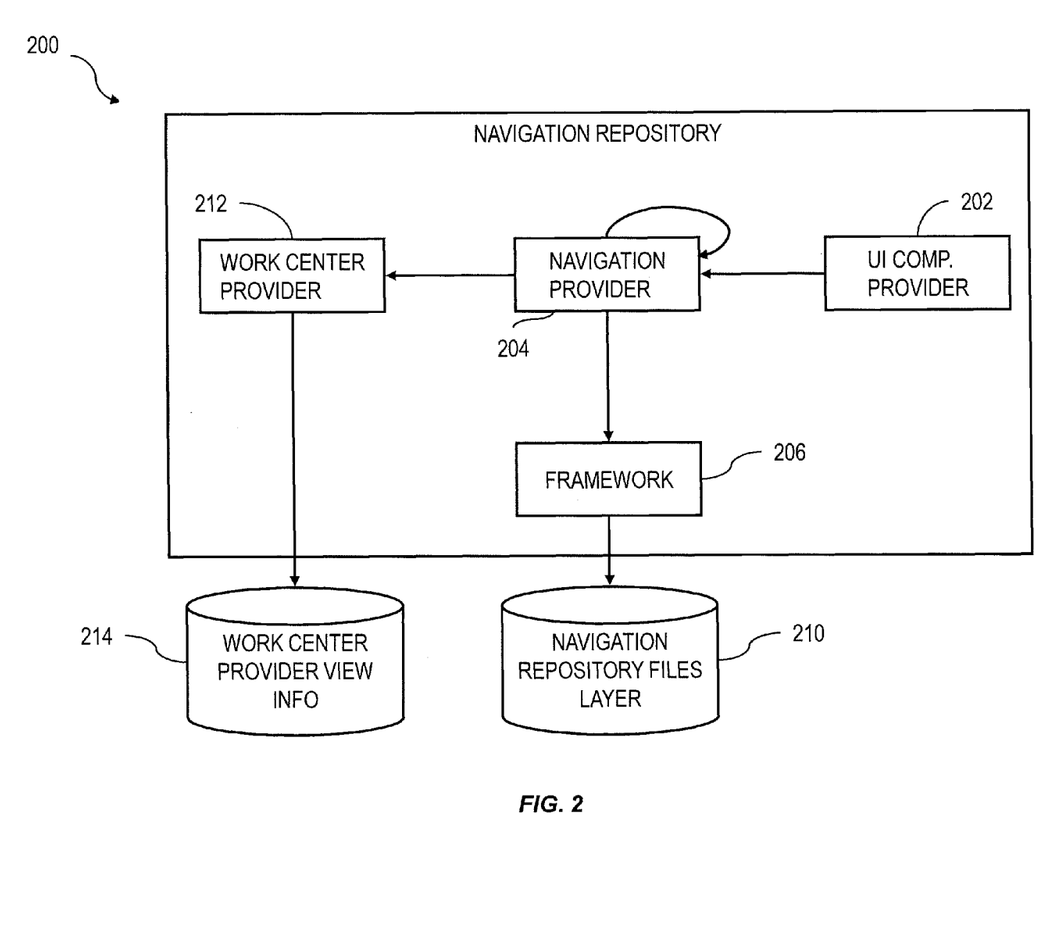
FIG. 2 is a diagram illustrating a runtime sequence of resolving a navigation target.

A central entity, for example a navigation repository 200, can manage navigation in the lean stack user interface. Navigation links can be registered to this central entity, and navigation targets can be resolved. At runtime the navigation registry can obtain the navigation query from the user interface component provider with a request to resolve it to a target component, for example as shown in the runtime sequence within the navigation repository 200 illustrated in FIG. 2. The navigation descriptor ID can be computed based on the information of the navigation query provided by a user interface component provider 202 to a navigation provider 204. With this navigation descriptor ID, the lookup in the navigation repository 200 is performed according to a user interface framework 206. If a navigation descriptor exists for the navigation descriptor ID in a navigation repository files layer 210, the contained target user interface component is checked against the current user context, for example by calling a work center provider 212 which performs a check with a work center provider view repository 214. If a work center and work center view are part of the navigation query, the target user interface component can be checked further if it is contained exactly in this work center view and if the user has this view assigned. If the target user interface component is available in the current user context, it is returned as navigation target. If not, the same process is applied to the fallback floor plan, if the fallback floorplan exists.

Figure 3:
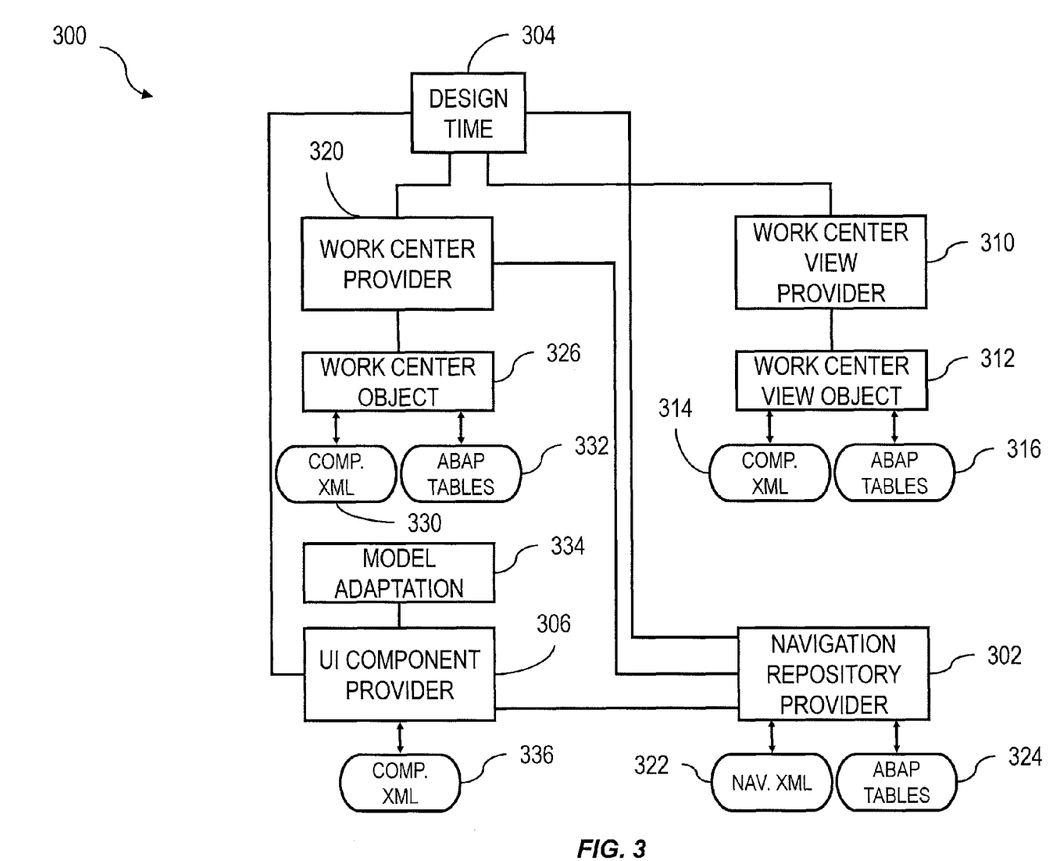
FIG. 3 is a diagram illustrating navigation registry interfaces.

As illustrated in the navigation registry map 300 of FIG. 3, a navigation repository provider 302 can be defined at design time 304. The navigation repository provider 302 can receive definitions of one or more user interface components from a user interface component provider 306. A work center view provider 310 can also be defined at design time 304. The work center view provider 310 access a work center object 312 that includes definitions of views to be presented to a user in the work center view. The work center object 312 accesses and writes to XML or other language definitions of user interface components 314 as well as to data and/or metadata tables 316 in ABAP or another language. A work center provider 320 can be accessed by the navigation repository provider based on one or more navigation links 322 (e.g. in XML or some other language) and one or more data and/or metadata tables 324 in ABAP or another language. The work center provider calls a work center object 326 that accesses and writes to XML or other language definitions of user interface components 330 as well as to data and/or metadata tables 332 in ABAP or another language. A model adaptation 334 is prepared based on the user interface component provider 306 according to XML or other language definitions of user interface components 336.

For each navigation query, such as for example, a business object namespace, a business object name, a node name, an operation, and optionally a context attribute, a navigation descriptor file can be stored in the navigation repository. The file name can be based on the navigation query. As an illustrative example, a business object namespace can be "myns," a business object name can be "mybo," a node name can be "root," an operation can be "create," and a file name can be "myns-mybo-root-create.uinav." The parts of the navigation query and the port type ID of a navigation can be stored as file attributes. The port type package and the target user interface component(s) can be stored as navigation repository references of types "nav" and "prt" for the navigation descriptor file. The navigation descriptor changes can be activated and transported together with the user interface component files.

A list of default operations can be provided by the navigation registry to the user interface designer via a remote function module. These operations can be offered in the user interface designer when defining a floor plan in-port or navigation in case no operation has been defined so far for a selected business object. If there are custom operations defined for a business object, they can be merged together with the default operations in the user interface designer.

When an in-port or a navigation is defined, the user interface designer can request navigation information for a selected business object (namespace, name+node name) from the navigation registry via the remote function module. The information can include already defined operations and context attributes and can assist the user in defining a navigation or allowing the user interface designer to check if the navigation query defined in an in-port is already defined in another floor plan. This is not allowed if the navigation should not be scope depended.

When a target floor plan is saved in the user interface designer, the navigation repository can invoke a put file method of the user interface component provider to store the floor plan model. Here, a dynamic navigation repository extension class can be called by the provider. This class can be a place where aspects of the user interface model can be extracted. For the navigation there can be a dedicated navigation repository navigation adaptation class that is called by the dynamic navigation repository extension class on every put file call to extract navigation relevant information. For navigation registration the information of the in-ports of a user interface component need to be extracted.

Once the in-port information is extracted from a floor plan, the in-port information can be passed over to the navigation registry via a "register in ports" call. During registration of in-ports at the navigation registry, for every navigation query a navigation descriptor file can be created, containing all navigation relevant information to resolve a navigation target. The files can be saved via one or more methods, such as for example a write/create content method, a write/edit content method, a write/save method, or the like, to ensure that the navigation descriptors are activated and transported together with the leading user interface models. References to the port type package and the navigation target or targets can be stored as XML and extracted in a navigation repository navigation provider class to pass them over to the navigation repository in a put file call. These references can be necessary to retrieve all navigation descriptors that are valid for a user interface component and to store references to navigation repository files such as the port type package as structured information while exceeding the limit of 255 characters for file attributes (file paths can be up to 512 characters long). In case a navigation query is no longer used in user interface models, a write/delete content method can be used to delete the navigation descriptor file again. During this process the a search method to identify all navigation descriptor files that reference the current user interface model as a navigation target can be executed to remove the user interface model reference from the navigation target descriptors if it is no longer registered for these navigations.

For each navigation query a check can be conducted, for example by execution of a read content method, to determine whether a navigation repository file (e.g. a navigation descriptor) exists. If the navigation repository file exists, the registry can then determine whether the navigation target is assigned to the current user via work center view assignment.

User interface scoping means that user interface models are adapted according to the selected scope that the customer has configured. The user interface adaptation process can be triggered by a business configuration deployment. In this process all user interface models can be checked for scoping dependent visibility rules. For each visibility rule, the rule can be validated to find out if the scopable user interface element is in scope or not. As part of this process, navigation sections can be removed from the user interface models in case no registered navigation target is in scope for a navigation query. In other words, the navigation sections can only be removed in a consecutive run after all floor plans have been removed if not in scope. The corresponding navigation descriptor file can be deleted in the scoping layer as well.

Whenever a user interface model is loaded to the client, the runtime can request the content of the user interface model from the navigation repository via a file path. This request can be forwarded to the user interface component provider or in case of a work center to the work center provider. In both providers, a navigation repository dynamic extension class can be called. Inside this extension, a navigation repository navigation adaptation class can be called to remove from the user interface model one or more navigation definition sections that have no corresponding navigation target for the current user. A navigation definition section can lack a corresponding navigation target if a navigation target is part of another work center view that is not assigned to the current user. Once the navigation sections are extracted from the user interface model, the navigation registry can be called with the a resolve navigation on load method.

If no navigation descriptor is found and a context attribute is part of the navigation query, the navigation registry can attempt to determine a fallback navigation target by leaving the context attribute blank while attempting to resolve the navigation target for this adapted navigation query. The user interface runtime can call the navigation registry with a resolve dynamic navigation method to obtain the resolved navigation target for a navigation that depends on instance data.

Navigation extensions can enable application groups to actively influence the navigation target in case the navigation is based on instance data. A redirect navigation call can be implemented for this purpose. During a resolve dynamic navigation call, the navigation registry can first call the redirect navigation method of the relevant navigation extension. A different navigation query can be returned and can be used to resolve the navigation target. If the navigation query of the import parameter is returned as an export parameter, the original navigation query can then be resolved. If an initial navigation query is returned, no navigation target is returned for the requested navigation.

A navigation extension can be required to implement a navigation repository navigation extension interface. For registration, a navigation extension class can be defined as part of the in-port to save it as part of the navigation descriptor. In case there is the need to implement a different logic in a higher navigation repository layer (e.g. globalization), the navigation extension of the lower layer should be extended.

Since every navigation query can be directly dependent on a port type, the resulting port type parameters for a redirected navigation that are required by the target user interface should be filled with the required instance data by the navigation extension. These data can be passed to the target floor plan by the user interface runtime.

For navigation to application UIs from external sources like mails, spread sheets a collaboration window, or the like, an ICF handler can be provided to redirect to the runtime application user interface, passing all relevant parameters. The handler can registered via a transaction SICF for an appropriate navigation URL. The URL scheme for navigation can in some optional implementations be based on one or more URL query parameters, such as for example "bo," "bo_ns," "node," "operation," and "nav_attr."

Any additional parameter that is part of the relevant port type can be passed as a URL parameter or via a special HTTP header. URL parameters can be called like the port type parameters, with the prefix "nav_." For example, a parameter "UUID" can be provided via the URL parameter "nav_UUID." In case of many parameters (e.g. "create with reference" use cases), the parameters can be provided via the HTTP header attribute "nav_params" in the following format. Each parameter can include a name (e.g. just the parameter name of the port type without a prefix) and a value, connected via an operator such as "=." Parameters can be concatenated via the "#" sign. The beginning of the parameter sequence can be started by this sign as well, such as for example #name1=value1#name2=value2. The name and value parameters in this example must be encoded to not contain the separators "#" and "=." The result string is then base64 encoded.

If parameters are provided in the HTTP header attribute and in the URL query, the parameter lists can be merged to one. In case there is no navigation target for an request URL, a HTTP 404 error can be returned. If the parameters are not sufficient, a HTTP 400 error can be returned.

The handler can attempt to resolve the navigation target for the supplied data. In case a navigation target can be determined, the handler can send a redirect (HTTP 301) to the lean stack runtime URL with the navigation target as a query parameter and the port type parameters are passed as base64 encoded HTTP header attribute.

Figure 4:
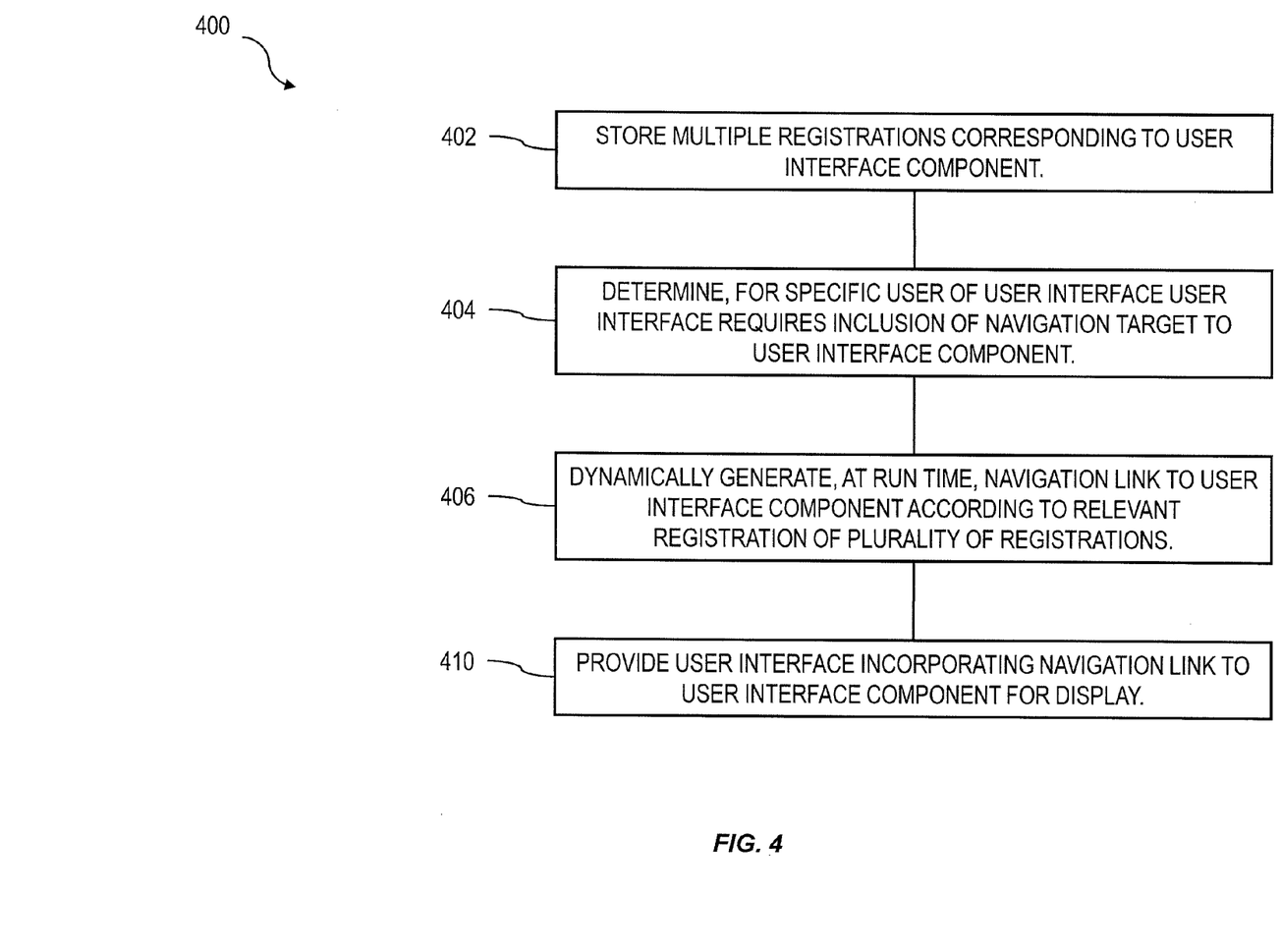
FIG. 4 is a process flow diagram illustrating aspects of a method consistent with implementations of the current subject matter.

In one aspect, an of which is illustrated in the process flow chart 400 of FIG. 4, a method consistent with the current subject matter can include storing multiple registrations corresponding to a user interface component at 402, and determining, for a specific user of a user interface, that the user interface requires inclusion a navigation target to the logical user interface component at 404. The target determination can be based on one or more of a layer of a software architecture within which the user is currently navigating, an assignment of a work center view that the user is authorized to access, and business data with which the user is currently working. At run time, a navigation link to the user interface component can be dynamically generated according to a relevant registration selected from the multiple registrations at 406. At 410, the user interface can be provided for display, for example via a client machine, to incorporate the navigation link to the user interface component. Layers can include a customer, an external content provider layer, and a core software platform layer.

Figure 5:
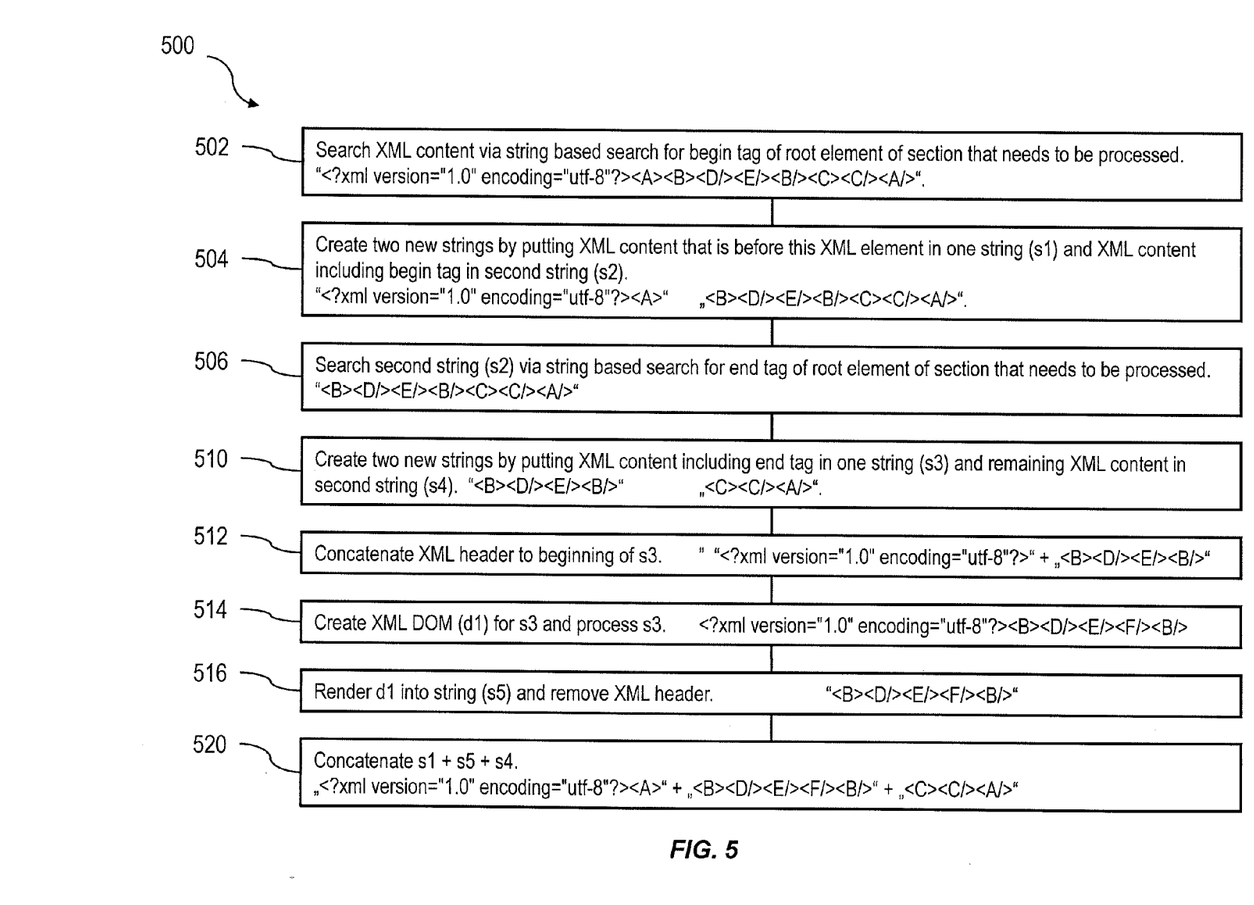
FIG. 5 is a listing of process steps that can be used to dynamically modify navigation targets specified as XML strings.

FIG. 5 shows a process flow chart 500 illustrating features of a method for dynamically and efficiently processing dedicated XML segments in large XML documents. Implementations of the current subject matter can use such an approach to dynamically construct navigation links for a flexible user interface. At 502, a string based search can be conducted for a begin tag of a root element of an XML content section that needs to be processed. Two new strings can be created at 504 by putting XML content that is before this XML element in one string (s1) and XML content including the begin tag in a second string (s2). The second string (s2) can be search at 506 via a string based search for an end tag of the root element of the section that needs to be processed. Two new strings can be created at 510 by putting XML content including the end tag in one string (s3) and the remaining XML content in a second string (s4). At 512, an XML header is concatenated to the beginning of s3. An XML document object model (DOM) (d1) can be created at 514 for s3, and s3 can be processed. At 516, d1 can be rendered into a new string (s5) and the XML header can be removed. String s4 can be created at 520 by concatenating s1+s5+s4.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. Making modifications to the core software platform, for example updating to a new version, implementing a change to the core functionality, or the like, can become a complicated and unpredictable process if each tenant's customized data objects and other tenant-specific configurations do not react in the same manner to the modifications. Additionally, during a lifecycle management event, such as for example an upgrade or update, many application specific tasks may have to be executed in a multi-tenant system. One or more of these actions have to run on every business tenant that exists in the multi-tenant system. However, to start a task on a specific tenant, a user logon with password can be necessary, thereby requiring that the lifecycle management procedure have ready access to authentication information, such as for example user names and passwords, for each tenant. Such a requirement can create numerous disadvantages, including but not limited to security concerns, logistical difficulties pertaining to maintaining a current listing of authentication information for numerous tenants, and the like.

To address these and potentially other issues, one or more implementations of the current subject matter provide methods, systems, articles or manufacture, and the like that can, among other possible advantages, provide improved and streamlined procedures for enacting changes, updates, and the like to multi-tenant software delivery architectures.

Figure 6:
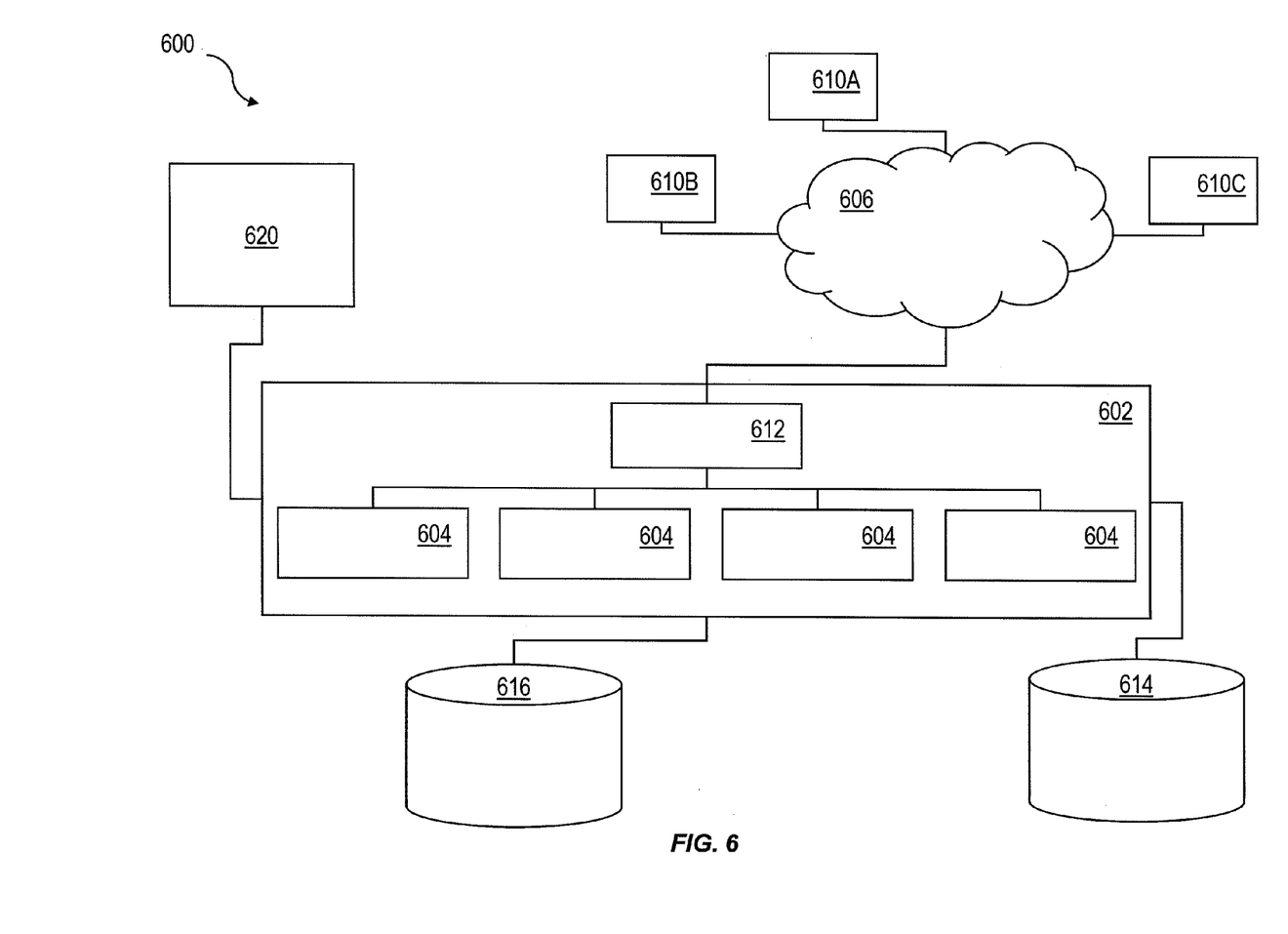
FIG. 6 is a diagram showing an example of a multi-tenant approach to providing customized software services to multiple organizations from a single architecture.

FIG. 6 shows a block diagram of a multi-tenant implementation of a software delivery architecture 600 that includes an application server 602, which can in some implementations include multiple server systems 604 that are accessible over a network 606 from client machines operated by users at each of multiple organizations 610A-610C (referred to herein as "tenants" of a multi-tenant system) supported by a single software delivery architecture 600. For a system in which the application server 602 includes multiple server systems 604, the application server can include a load balancer 612 to distribute requests and actions from users at the one or more organizations 610A-610C to the one or more server systems 604. A user can access the software delivery architecture across the network using a thin client, such as for example a web browser or the like, or other portal software running on a client machine. The application server 602 can access data and data objects stored in one or more data repositories 614. One or more metadata repositories 616 which can include the navigation repository 200 discussed above, can store metadata. The application server 602 can also serve as a middleware component via which access is provided to one or more external software components 620 that can be provided by third party developers.

Figure 7:
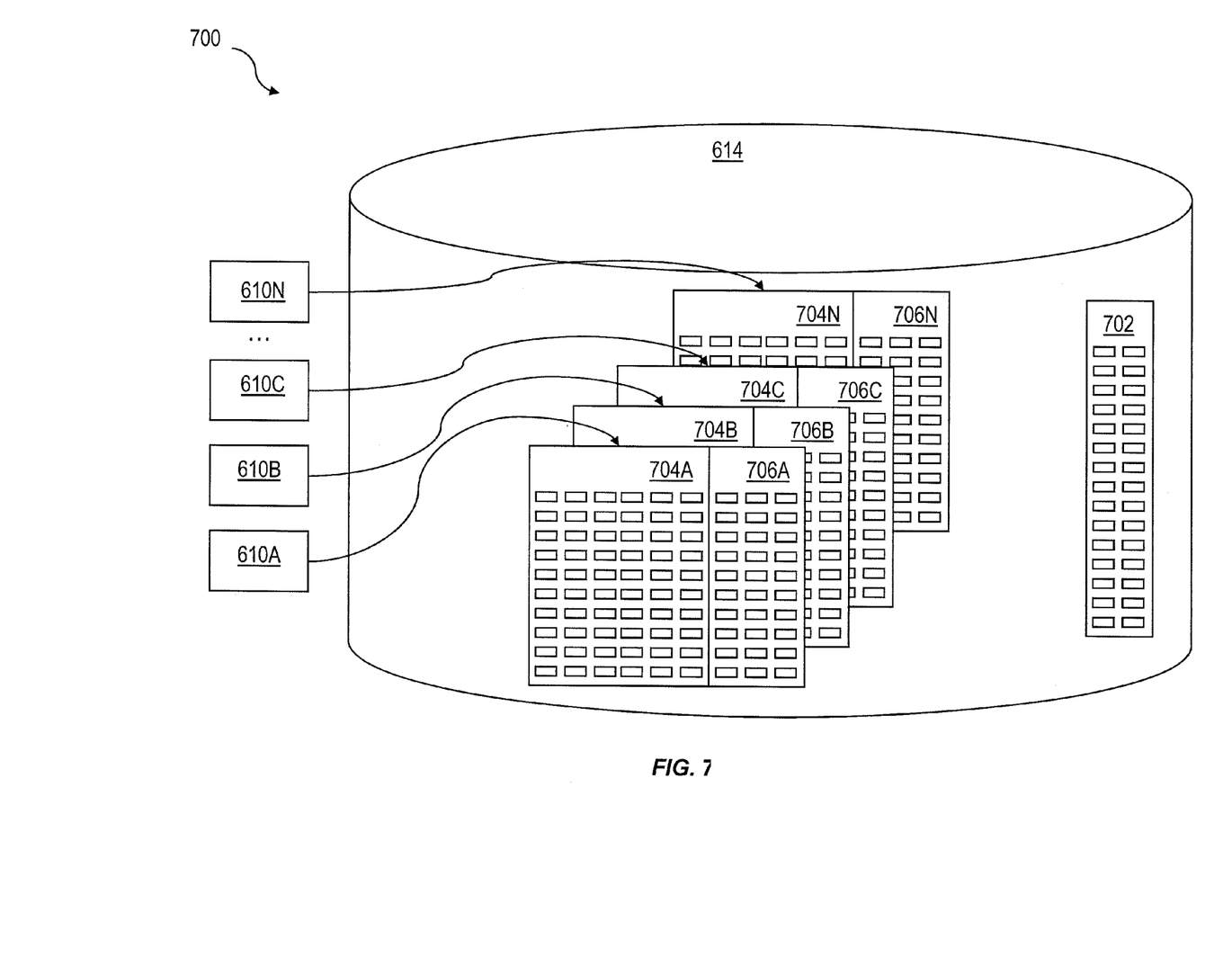
FIG. 7 is a diagram showing storage of both core software package data objects and tenant-specific data objects for each of multiple tenants of a multi-tenant system.

To provide for customization of the core software platform for each of multiple organizations supported by a single software delivery architecture 600, the data and data objects stored in the repository or repositories 614 that are accessed by the application server 602 can include three types of content as shown in FIG. 7: core software platform content 702, system content 704, and tenant content 706. Core software platform content 702 includes content that represents core functionality and is not modifiable by a tenant. System content 704 can in some examples be created by the runtime of the core software platform and can include core data objects that are modifiable with data provided by each tenant. For example, if the core software platform is an ERP system that includes inventory tracking functionality, the system content 704A-704N can include data objects for labeling and quantifying inventory. The data retained in these data objects are tenant-specific: for example, each tenant 610A-610N stores information about its own inventory. Tenant content 706A-706N includes data objects or extensions to other data objects that are customized for one specific tenant 610A-610N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 706 can include condition records in generated condition tables, access sequences, price calculation results, or any other tenant-specific values. A combination of the software platform content 702 and system content 704 and tenant content 706 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 602 that includes multiple server systems 604 that handle processing loads distributed by a load balancer 612. Potential benefits from such an arrangement can include, but are not limited to, high and reliably continuous application server availability and minimization of unplanned downtime, phased updating of the multiple server systems 604 to permit continuous availability (one server system 604 can be taken offline while the other systems continue to provide services via the load balancer 612), scalability via addition or removal of a server system 604 that is accessed via the load balancer 612, and de-coupled lifecycle processes (such as for example system maintenance, software upgrades, etc.) that enable updating of the core software independently of tenant-specific customizations implemented by individual tenants.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a machine-readable medium non-transitorily storing instructions that, when executed by at least one programmable processor, cause the at least one programmable processor to perform operations comprising:

storing, at a navigation repository, a plurality of registrations corresponding to a user interface component of a user interface of a software architecture, the software architecture including a sequence of layers, the user interface component residing within a layer of the sequence of layers, the sequence of layers comprising a core software application layer for providing content of a core software application, a partner layer for providing content from software components external to the core software application, and a customer layer for personalization content of a customer user of the core software application, each layer of the sequence of layers defining a navigation target descriptor indicating supported navigation requests and defining a navigation target based on the sequence of layers within which the user interface component resides, a layering strategy defining the sequence of layers consistent with a business scope of the software architecture to which a user has authorized access;

determining that the user interface presented to the user requires a navigation target to the user interface component based on the business scope, including determining an assignment of a work center view to the user and determining that business data of an organization to which the user belongs indicates a need for the user interface component;

retrieving, from the navigation repository, a template string for the navigation target;

dynamically generating, at run time, a navigation link to the user interface component according to a relevant registration selected according to the navigation target descriptor from the plurality of registrations;

providing, to a client machine for display, the user interface incorporating the navigation link to the user interface component;

receiving a navigation query provided by a user interface component provider with a request to resolve it to a target component; and computing a navigation descriptor identifier for the specific user can be computed based on information in the navigation query;
wherein the relevant registration is selected according to the navigation descriptor identifier.

2. A computer program product as in claim 1, wherein the dynamically generating the navigation link comprises the following operations:
splitting the template string into a first sub string including content of the template string occurring prior to a first tag element indicating a start point of a section of the template where a custom navigation link is to be embedded and a second substring including content of the template string occurring subsequent to the first tag element;
splitting the second sub string into a third sub string including content of the second substring prior to a second tag element indicating an endpoint of the section of the template and a fourth substring including content of the second substring subsequent to the second tag element;
generating a fifth substring, the generating comprising appending an header to a beginning of the third sub string, creating a document object model for the third sub string, processing the third substring using the document object model, and removing the header; and
concatenating the first sub string, the fifth sub string, and the fourth sub string to form the navigation link.

3. A computer program product as in claim 1, wherein the user interface is provided to the user via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the data repository comprising core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

4. A computer program product as in claim 3, wherein the user interface component provides access to one of the core platform content, the system content, the client tenant-specific content, and external service provider content from the at least one external service provider.

5. A system comprising:
at least one programmable processor; and
a non-transitory machine-readable medium storing instructions that, when executed by the at least one programmable processor, cause the at least one programmable processor to perform operations comprising:
storing, at a navigation repository, a plurality of registrations corresponding to a user interface component of a user interface of a software architecture, the software architecture including a sequence of layers, the user interface component residing within a layer of the sequence of layers, the sequence of layers comprising a core software application layer for providing content of a core software application, a partner layer for providing content from software components external to the core software application, and a customer layer for personalization content of a customer user of the core software application, each layer of the sequence of layers defining a navigation target descriptor indicating supported navigation requests and defining a navigation target based on the sequence of layers within which the user interface component resides, a layering strategy defining the sequence of layers consistent with a business scope of the software architecture to which a user has authorized access;
determining that the user interface presented to the user requires a navigation target to the user interface component based on the business scope, including determining an assignment of a work center view to the user and determining that business data of an organization to which the user belongs indicates a need for the user interface component;
retrieving, from the navigation repository, a template string for the navigation target;
dynamically generating, at run time, a navigation link to the user interface component according to a relevant registration selected according to the navigation target descriptor from the plurality of registrations;
providing, to a client machine for display, the user interface incorporating the navigation link to the user interface component;
receiving a navigation query provided by a user interface component provider with a request to resolve it to a target component; and
computing a navigation descriptor identifier for the specific user can be computed based on information in the navigation query;
wherein the relevant registration is selected according to the navigation descriptor identifier.

6. A system as in claim 5, wherein the dynamically generating the navigation link comprises the following operations:
splitting the template string into a first substring including content of the template string occurring prior to a first tag element indicating a start point of a section of the template where a custom navigation link is to be embedded and a second substring including content of the template string occurring subsequent to the first tag element;
splitting the second sub string into a third sub string including content of the second substring prior to a second tag element indicating an endpoint of the section of the template and a fourth substring including content of the second substring subsequent to the second tag element;
generating a fifth substring, the generating comprising appending an header to a beginning of the third sub string, creating a document object model for the third sub string, processing the third substring using the document object model, and removing the header; and
concatenating the first sub string, the fifth sub string, and the fourth sub string to form the navigation link.

7. A system as in claim 5, wherein the user interface is provided to the user via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the data repository comprising core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

8. A system as in claim 7, wherein the user interface component provides access to one of the core platform content, the system content, the client tenant-specific content, and external service provider content from the at least one external service provider.

9. A computer-implemented method comprising:
storing, at a navigation repository, a plurality of registrations corresponding to a user interface component of a user interface of a software architecture, the software architecture including a sequence of layers, the user interface component residing within a layer of the sequence of layers, the sequence of layers comprising a core software application layer for providing content of a core software application, a partner layer for providing content from software components external to the core software application, and a customer layer for personalization content of a customer user of the core software application, each layer of the sequence of layers defining a navigation target descriptor indicating supported navigation requests and defining a navigation target based on the sequence of layers within which the user interface component resides, a layering strategy defining the sequence of layers consistent with a business scope of the software architecture to which a user has authorized access;
determining that the user interface presented to the user requires a navigation target to the user interface component based on the business scope, including determining an assignment of a work center view to the user and determining that business data of an organization to which the user belongs indicates a need for the user interface component;
retrieving, from the navigation repository, a template string for the navigation target;
dynamically generating, at run time, a navigation link to the user interface component according to a relevant registration selected according to the navigation target descriptor from the plurality of registrations;
providing, to a client machine for display, the user interface incorporating the navigation link to the user interface component;
receiving a navigation query provided by a user interface component provider with a request to resolve it to a target component; and
computing a navigation descriptor identifier for the specific user can be computed based on information in the navigation query;
wherein the relevant registration is selected according to the navigation descriptor identifier; and wherein the storing of the plurality of registrations, the determining that the user interface requires the navigation target, the retrieving, the dynamically generating, the providing, the receiving of the navigation query, and the computing of the navigation descriptor are performed by at least one system comprising at least one programmable processor.

10. A computer-implemented method as in claim 9, wherein the dynamically generating the navigation link comprises:
splitting the template string into a first sub string including content of the template string occurring prior to a first tag element indicating a start point of a section of the template where a custom navigation link is to be embedded and a second substring including content of the template string occurring subsequent to the first tag element;
splitting the second sub string into a third sub string including content of the second substring prior to a second tag element indicating an endpoint of the section of the template and a fourth substring including content of the second substring subsequent to the second tag element;
generating a fifth substring, the generating comprising appending an header to a beginning of the third sub string, creating a document object model for the third sub string, processing the third substring using the document object model, and removing the header; and
concatenating the first sub string, the fifth sub string, and the fourth sub string to form the navigation link.

11. A computer-implemented method as in claim 9, wherein the user interface is provided to the user via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the data repository comprising core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

12. A computer-implemented method as in claim 11, wherein the user interface component provides access to one of the core platform content, the system content, the client tenant-specific content, and external service provider content from the at least one external service provider.

* * * * *